United States Patent
Wihinen

(10) Patent No.: US 8,235,162 B2
(45) Date of Patent: Aug. 7, 2012

(54) DRIVER INTERFACE ASSEMBLY

(75) Inventor: Kimmo Wihinen, Laukaa (FI)

(73) Assignee: Valtra Oy Ab, Suolahti (FI)

( * ) Notice: Subject to any disclaimer, the term of this patent is extended or adjusted under 35 U.S.C. 154(b) by 119 days.

(21) Appl. No.: 12/922,164

(22) PCT Filed: Feb. 26, 2009

(86) PCT No.: PCT/EP2009/052296
§ 371 (c)(1),
(2), (4) Date: Oct. 5, 2010

(87) PCT Pub. No.: WO2009/112376
PCT Pub. Date: Sep. 17, 2009

(65) Prior Publication Data
US 2011/0025108 A1    Feb. 3, 2011

(30) Foreign Application Priority Data
Mar. 12, 2008  (GB) .................................. 0804510.6

(51) Int. Cl.
*B60K 35/00*    (2006.01)
(52) U.S. Cl. ................. 180/334; 74/471 XY; 297/463.1
(58) Field of Classification Search ................. 180/334, 180/315; 297/188.14, 188.15, 188.16, 463.1, 297/463.2; 74/546, 547, 519, 471 XY
See application file for complete search history.

(56) References Cited

U.S. PATENT DOCUMENTS

| | | | | |
|---|---|---|---|---|
| 3,632,161 A * | 1/1972 | Arfaras et al. | ................. | 297/145 |
| 4,052,103 A * | 10/1977 | Steinthal | ................. | 297/411.32 |
| 5,248,183 A * | 9/1993 | Gignac et al. | ............. | 297/188.16 |
| 5,271,661 A * | 12/1993 | Gould et al. | ............. | 297/188.15 |
| 5,316,369 A * | 5/1994 | Kanda | ...................... | 297/188.15 |
| 5,398,991 A * | 3/1995 | Smith et al. | ............. | 297/188.16 |
| 6,880,855 B2 * | 4/2005 | Chernoff et al. | ............. | 280/778 |
| 7,661,505 B2 * | 2/2010 | Spykerman et al. | .......... | 180/326 |
| 7,797,918 B2 * | 9/2010 | Drake et al. | .................... | 56/323 |
| 2004/0140145 A1 * | 7/2004 | Chernoff et al. | ............. | 180/333 |
| 2004/0159487 A1 * | 8/2004 | Wendeberg et al. | .......... | 180/315 |
| 2008/0066988 A1 * | 3/2008 | Asp et al. | ..................... | 180/333 |

* cited by examiner

Primary Examiner — Paul N Dickson
Assistant Examiner — Nicole Verley

(57) ABSTRACT

A driver interface assembly (10) is provided comprising a controller element (15) mounted to a body (16) which forms an integral part of an armrest (11) associated with a driver's seat (12). The body is rotatable with respect to the armrest between two positions: (a) an operating position, in which the controller element is exposed for operation thereof, and (b) a stowed position in which the controller element is concealed from use. The body remains substantially within the profile of the armrest when in both the operating position and the stowed position. The volume occupied by the armrest (11) can therefore be exploited to mount and stow a controller element (15). This is particularly advantageous in a working environment where space is at a premium.

11 Claims, 4 Drawing Sheets

DRIVER INTERFACE ASSEMBLY

TECHNICAL FIELD

The invention relates to a driver interface and in particular, but not exclusively, a driver interface operable by the driver of a utility vehicle.

BACKGROUND

Utility vehicles typically require many interfaces to allow the driver thereof to operate the various functions of the vehicle together with any attached implements. For example, the driver of a tractor having a front loader may be required to simultaneously control the speed and direction of the tractor and operate the numerous spool valves associated with the various controls of the loader. The latter in particular is traditionally controlled by the means of levers, both two-way linear levers and those in the form of 4-way joysticks for example.

SUMMARY OF INVENTION

It is an object of the invention to provide a driver interface which is easily accessible to the driver but does not hinder easy access to other driver interfaces. It is another object of the invention to provide a driver interface that delivers improved safety in operation.

Thus, in accordance with the invention there is provided a driver interface assembly comprising a lever, at least operable in a linear motion either side of a central position, mounted to a body which forms an integral part of an armrest associated with a driver's seat, the body being rotatable with respect to the armrest between an operating position, in which the lever is exposed for operation thereof, and a stowed position in which the lever is concealed from use, wherein the body remains substantially within the profile of the armrest when in both the operating position and the stowed position, wherein the body rotates from the operating position to the stowed position through 270° so that the lever is located within the outline of the armrest when in the stowed position.

The invention makes use of the available surface in the cab by providing a controller element on the armrest whilst also optimising the use of that space by stowing the controller element when not in use. Furthermore, the safety of the vehicle operation is improved by reducing the risk of accidental operation of the controller element caused by unintended contact from the drivers arm for example.

Advantageously, the body substantially conforms with the profile of the arm rest when in both positions. Therefore, the only ergonomic difference between the two positions presented to the driver is the presence or absence of the controller element.

Preferably, the body is positioned at the forward end of the armrest. Advantageously, this positions the controller element in the most ergonomically friendly place for the driver to operate.

In a preferred embodiment the body is rotatable around a transverse axis with respect to an elongate axis of the armrest. The body may be mounted and supported between two integral extensions of the armrest allowing rotational movement therebetween around the transverse axis. Advantageously, the integral extensions of the armrest can provide reliable and sturdy support for the mounting of the body by attaching to pivot points located on the axis of rotation on both sides of the body. The extensions may also provide ducting for any electrical leads to the controller element required for the operation thereof.

For increased functionality the lever may be a joystick that is operable in a plurality of directions away from the central position. The lever may control the actuation of hydraulic rams on an attached front loader for example.

The lever may be located within the outline of the armrest when in the stowed position. Advantageously, by stowing the lever within the profile of the armrest, the lever is rendered inoperable thereby preventing any accidental operation thereof.

The lever may be located in a cooperating depression which is moulded into the underside of the armrest when in the stowed position. This increases the concealment of the lever and the associated advantages thereof as well as providing a more sturdy arrangement in which the stowed lever is better supported.

When in the stowed position the exposed surface of the body preferably forms an extension of the armrest. This improves the concealment of the controller element whilst making the implementation of an assembly in accordance with the invention more ergonomically friendly for the driver.

To reduce the risk of unintended activation of the controller element when moving the body from one position to another, preferably the controller element is only operable when the body is in the operating position. Therefore, the controller element is deactivated once the body is moved away from the operating position.

BRIEF DESCRIPTION OF THE DRAWINGS

Further advantages will become apparent from the following description of specific embodiments with reference to the accompanying drawings in which.

DESCRIPTION OF EXAMPLE EMBODIMENTS

Figure 1:
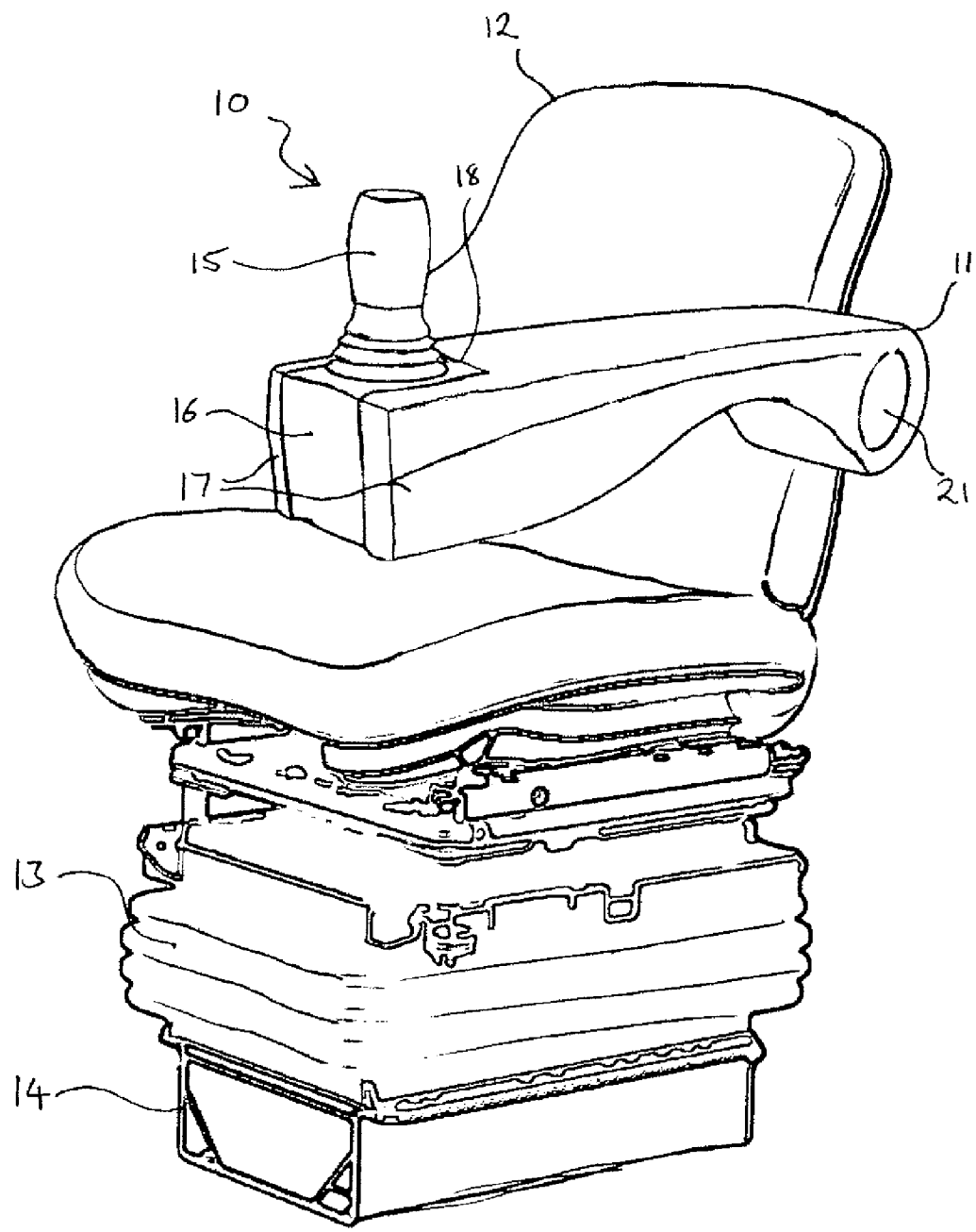
FIG. 1 is a perspective view of a driver's seat in a utility vehicle fitted with a driver interface assembly in accordance with one embodiment of the invention showing the body in an operating position.
Figure 2:
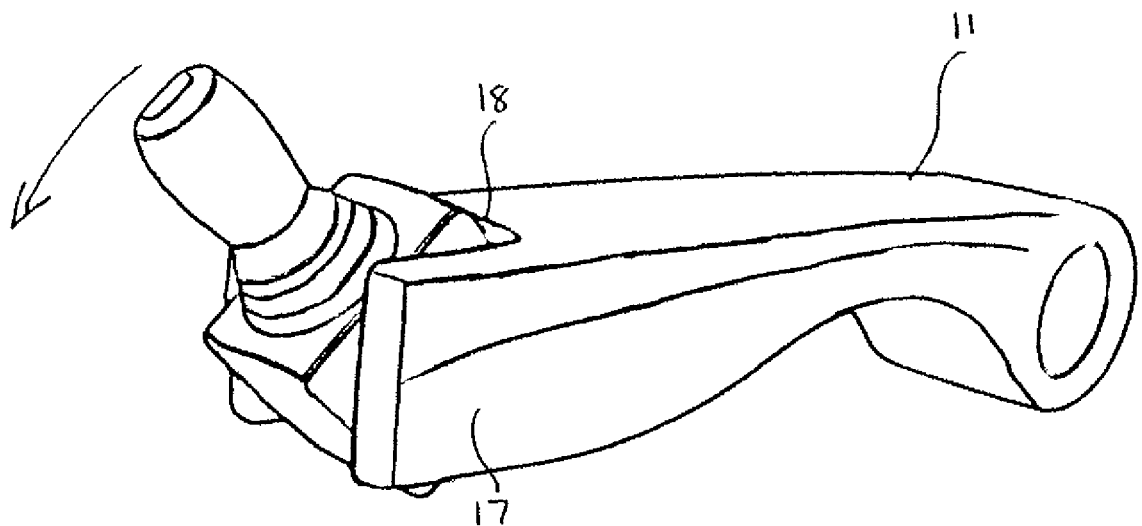
FIGS. 2 and 3 are perspective views of the driver interface assembly of FIG. 1 showing the body thereof in intermediate positions between the operating position and the stowed position.
Figure 3:
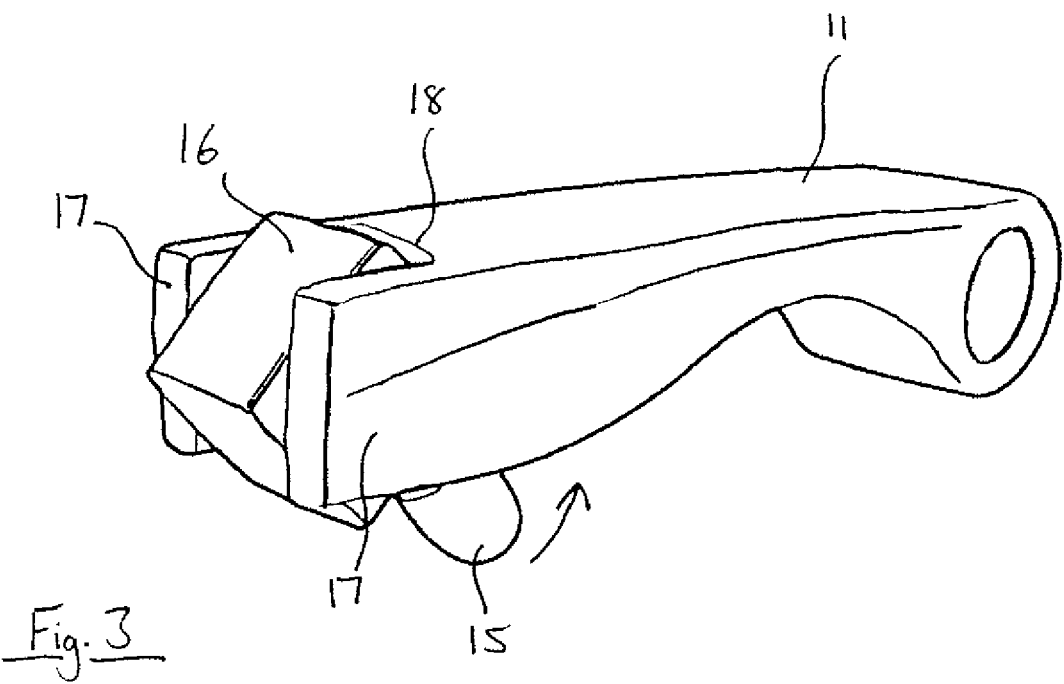

With reference to the figures a driver interface assembly, referenced generally at 10, is mounted to an arm rest 11 of a driver's seat 12. The driver's seat 12 is of a known configuration and comprises suspension means 13 and a mounting plate 14. Although not critical to the scope of the invention, seat 12 in this example is fixed to the floor tray of a tractor cab (not shown). However it will be appreciate that the driver's seat 12 may be implemented in any utility vehicle.

The driver interface assembly 10 comprises a joystick 15 mounted to a body 16 which forms an integral part of the arm rest 11. In this embodiment, joystick 15 serves to control actuation of various hydraulic rams on an attached front loader (not shown). The joystick 15 is moveable in a longitudinal direction either side of the central position shown, and in a transverse direction to the left and right of the central position. It will be appreciated by the skilled person that the joystick 15 can serve to control any controllable function of the utility vehicle, or any implement attached thereto, which lends itself to being controlled by a joystick. For example the longitudinal displacement of the joystick could instead be employed to control the forward speed of the vehicle.

Figure 4:
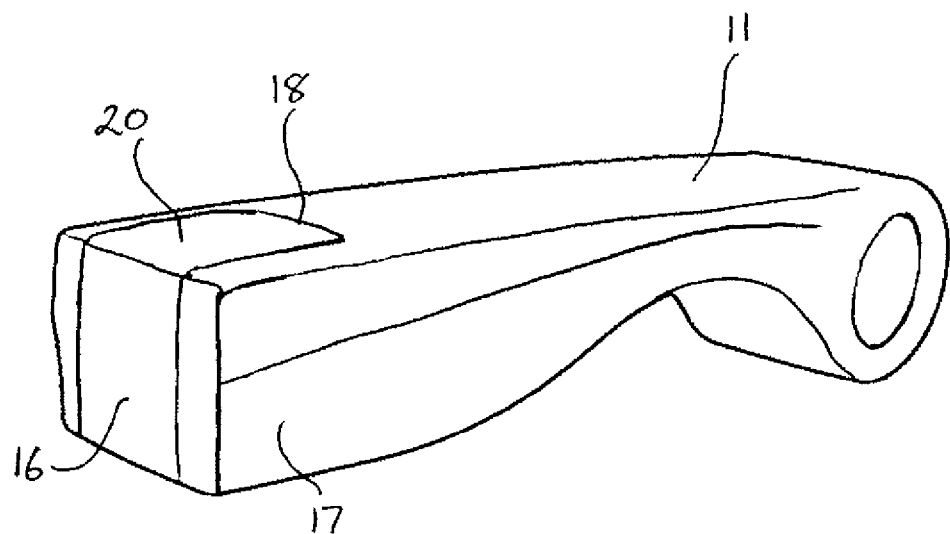
FIG. 4 is a perspective view of the driver interface assembly of FIG. 1 showing the body thereof in the stowed position.
Figure 5:
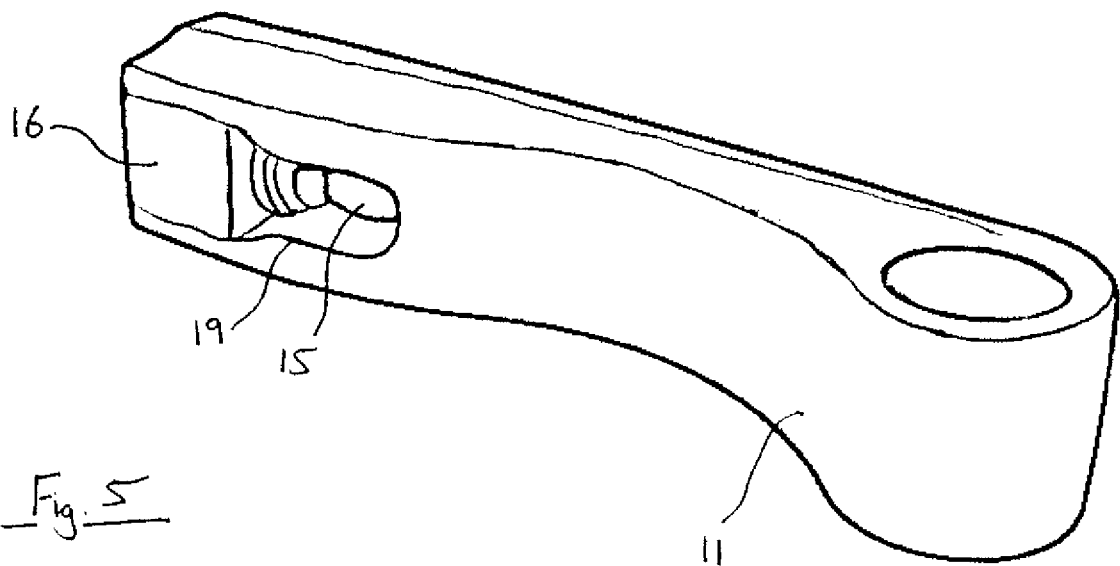
FIG. 5 is a perspective view of the underside of the driver interface assembly of FIG. 1 showing the body thereof in the stowed position.

In accordance with the invention, the body 16 to which the joystick 15 is attached is rotatable between an operating position as shown in FIG. 1 to a stowed position as shown in FIGS. 4 and 5. When in the operable position the joystick 15 is exposed for operation by the driver. Whereas when in the stowed position the joystick 15 is concealed from use thereby preventing any accidental actuation of the joystick 15 by movement of the driver's arms for example.

Figure 6:
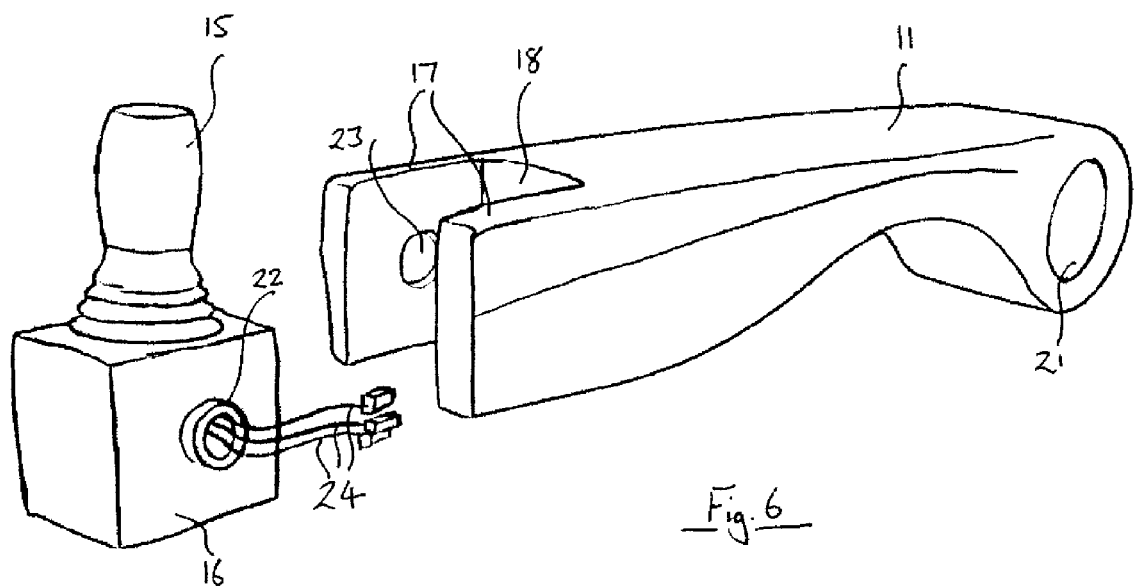
FIG. 6 is a perspective view of the driver interface assembly of FIG. 1 showing the body thereof in exploded form; and, FIG. 7 is a perspective view of the driver interface assembly of FIG. 1 showing the detail of the body thereof.
Figure 7:
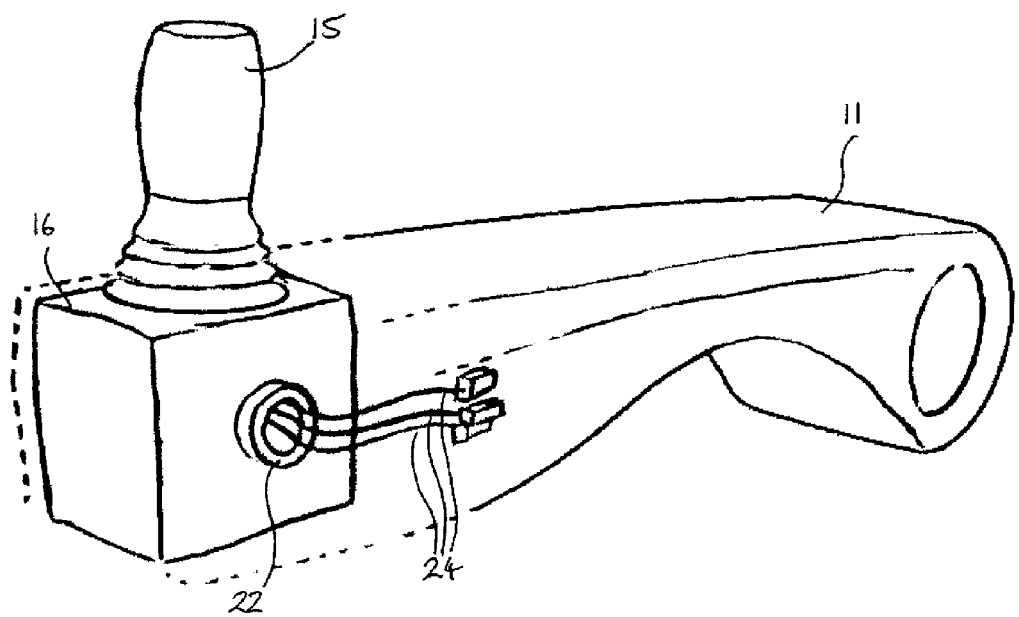

The body 16 pivots around two attachment points (FIGS. 6 and 7) on the inside edges of integral extensions 17 of the arm rest 11. In effect, the integral extensions 17 and an inside edge 18, provided by the main arm rest 11, provide walls which define a cavity in which the body 16 is located. The attachment points are simply provided by hollow spindles 22 which turn within a respective recess 23 located in the inside faces of the integral extensions 17. Electrical leads 24 for joystick sensing means pass through the hollow spindles 22 and through integral ducting provided inside the armrest 11. The leads 24 may then extend to the main dashboard control unit of the vehicle through the inside of the arm rest 11 and down the rear of the seat 12.

In an alternative embodiment, the sensing means for the controller element may communicate with the dashboard control unit via a wireless link such as a Bluetooth enabled link for example.

The body 16 is held in the operating position as shown in FIG. 1 by releasable locking means (not shown) which take the form of a sprung pin (not shown) inserted through the inside edge of the arm rest 11 adjacent the driver which can be withdrawn by the driver when necessary.

The body can rotate on its transverse axis through 270° into the stowed position as shown in FIGS. 4 and 5. A cooperating depression 19 formed in the underside of the arm rest 11 receives the stowed joystick as shown in FIG. 5. Furthermore when in the stowed position the exposed surface of the body 20 forms an extension of the arm rest on its upper face.

Advantageously by stowing the joystick 15 in accordance with the invention the arm rest 11 can be still raised into an upright position by a pivoting movement around connection 21 in a known manner.

Although the described embodiment employs a joystick 15 which is moveable in a plurality of directions away from the central position, it is envisaged that a simple linear 2-way lever can instead be used without deviating from the scope of the invention.

In summary therefore, there is provided a driver interface assembly comprising a controller element mounted to a body which forms an integral part of an armrest associated with a driver's seat. The body is rotatable with respect to the armrest between two positions: (a) an operating position, in which the controller element is exposed for operation thereof, and (b) a stowed position in which the controller element is concealed from use. The volume occupied by the armrest can be exploited to mount and stow a control element. This is particularly advantageous in a working environment where space is at a premium.

The invention claimed is:

1. A driver interface assembly comprising a lever, at least operable in a linear motion either side of a central position, mounted to a body which forms an integral part of an armrest associated with a driver's seat, the body being rotatable with respect to the armrest between an operating position, in which the lever is exposed for operation thereof, and a stowed position in which the lever is concealed from use, wherein the body remains substantially within the profile of the armrest when in both the operating position and the stowed position, wherein the body rotates from the operating position to the stowed position through 270° so that the lever is located within the outline of the armrest when in the stowed position.

2. An assembly according to claim 1, wherein the body is positioned at the forward end of the armrest.

3. An assembly according to claim 2, wherein the body is rotatable around a transverse axis with respect to an elongate axis of the armrest.

4. An assembly according to claim 3, wherein the body is mounted and supported between two integral extensions of the armrest allowing rotational movement therebetween around the transverse axis.

5. An assembly according to claim 1, wherein the body is rotatable around a transverse axis with respect to an elongate axis of the armrest.

6. An assembly according to claim 5, wherein the body is mounted and supported between two integral extensions of the armrest allowing rotational movement therebetween around the transverse axis.

7. An assembly according to claim 1, wherein the lever is a joystick operable in a plurality of directions away from the central position.

8. An assembly according to claim 7, wherein when in the stowed position the exposed surface of the body forms an extension of the armrest.

9. An assembly according to claim 1, wherein the lever is located in a cooperating depression which is moulded into the underside of the armrest when in the stowed position.

10. An assembly according to claim 1, wherein the controller element is only operable when the body is in the operating position.

11. An apparatus, comprising:
   a utility vehicle having a driver's seat; and
   a driver interface assembly comprising a lever, at least operable in a linear motion either side of a central position, mounted to a body which forms an integral part of an armrest associated with the driver's seat, the body being rotatable with respect to the armrest between an operating position, in which the lever is exposed for operation thereof, and a stowed position in which the lever is concealed from use, wherein the body remains substantially within the profile of the armrest when in both the operating position and the stowed position, wherein the body rotates from the operating position to the stowed position through 270° so that the lever is located within the outline of the armrest when in the stowed position.

* * * * *